US006574362B1

(12) United States Patent
Kita

(10) Patent No.: US 6,574,362 B1
(45) Date of Patent: Jun. 3, 2003

(54) METHOD AND APPARATUS FOR MASK-PROCESSING A PHOTOGRAPHED IMAGE

(75) Inventor: Koji Kita, Wakayama (JP)

(73) Assignee: Noritsu Koki Co., Ltd., Wakayama (JP)

( * ) Notice: Subject to any disclaimer, the term of this patent is extended or adjusted under 35 U.S.C. 154(b) by 0 days.

(21) Appl. No.: 09/315,039

(22) Filed: May 20, 1999

(30) Foreign Application Priority Data

May 21, 1998 (JP) .......................................... 10-140291

(51) Int. Cl.⁷ .............................. G06K 9/00; G06K 9/40; G03F 3/08
(52) U.S. Cl. ...................... 382/162; 382/167; 382/274; 358/518
(58) Field of Search ................. 358/406, 504, 358/518–522, 534, 296, 302, 461, 510, 517, 519, 520, 521, 537, 538, 530; 382/162–167, 254, 274

(56) References Cited

U.S. PATENT DOCUMENTS

| | | |
|---|---|---|
| 4,339,517 A | 7/1982 | Akimoto |
| 4,789,892 A * | 12/1988 | Tsuzuki et al. .............. 358/537 |
| 5,079,624 A * | 1/1992 | Sasuga et al. .............. 358/538 |
| 5,420,704 A | 5/1995 | Winkelman |
| 5,715,377 A | 2/1998 | Fukushima et al. |
| 5,781,315 A * | 7/1998 | Yamaguchi .................. 358/520 |
| 5,798,842 A * | 8/1998 | Yamazaki .................... 358/302 |
| 5,875,021 A * | 2/1999 | Yamaguchi ................. 358/518 |

FOREIGN PATENT DOCUMENTS

| | | |
|---|---|---|
| EP | 0 441 558 A | 8/1991 |
| EP | 0 514 933 A | 11/1992 |
| EP | 0 566 064 A | 10/1993 |

* cited by examiner

Primary Examiner—Phuoc Tran
Assistant Examiner—Amir Alavi
(74) Attorney, Agent, or Firm—Smith Patent Office

(57) ABSTRACT

An apparatus and method for automatically adjusting density Information of pixels contained in image data is disclosed. The image processing method includes the steps of dividing the image data into a plurality of regions based on color information of the pixels contained in the image data and adjusting density information of the pixels contained in at least one particular region among the plurality of regions.

16 Claims, 6 Drawing Sheets

METHOD AND APPARATUS FOR MASK-PROCESSING A PHOTOGRAPHED IMAGE

BACKGROUND OF THE INVENTION

1. Field of the Invention

This invention relates to a system for processing a photographic image, and particularly to an image processing method and apparatus for automatically adjusting the density information of pixels contained in an image data set.

2. Discussion of the Related Art

Conventionally, a photograph is provided by printing an image onto photographic paper where the image has been shot on a film using a camera. The film (specifically, a negative film) has exposure characteristics and these characteristics have some margin or variations considering the varied conditions at the time of shooting. However, the photographic paper on which the image will be printed does not have such exposure characteristics. Accordingly, an image appearing in the film may not appear exactly on the printing paper.

For example, in case of photographing a person's figure where the background contains a window into which bright sunlight shines, it is difficult to print both the person's figure and the background with appropriate densities. This is because if it is desired to print the person's figure on the photographic paper using an appropriate density, the background is likely to be whited out due to under exposure. Alternatively if it is desired to print the background on the photographic paper with an appropriate density, the figure is likely to be blacked out due to over exposure.

Previously, an operation called "masked printing" has been necessary for printing both the person's figure and the background onto the photographic paper when the film is shot using the conditions described above. This operation requires a high level of printing skill since it varies the light exposure of one part of the photographic paper from another part by exposing one part of the photographic paper while masking the other part. Accordingly, masked printing has a problem in that it should be done by a manual operation using experts and thus it is expensive.

Also, there is a problem that, if a film is photographed in conditions where it is under exposed or over exposed, it is necessary to appropriately adjust the duration for printing the photographed image on the film to obtain a good photograph print.

SUMMARY OF THE INVENTION

It is an object of the present invention to provide an image processing method and an image processing apparatus that makes the masked printing technique unnecessary by automatically adjusting the density information of the pixels containing the image data.

Further, it is another object of the present invention to provide an image processing method and apparatus that makes it unnecessary to adjust the duration for printing an image even when the image or part of the image is photographed with conditions where it is under exposed or over exposed.

An image processing method of the present invention comprises the steps of dividing the image data into a plurality of regions based on color information of pixels contained in the image data; and adjusting the density information of the pixels contained in at least one particular region among the plurality of regions, whereby the above objects are achieved.

Another image processing method of the present invention is an image processing method for processing image data containing a plurality of pixels and comprises the steps of mapping the plurality of pixels into a plurality of points in color space, based on color information for each of the pixels; detecting a plurality of spaces contained in the color space, in accordance with the concentration of the plurality of points in the color space; adjusting the average density information of at least one particular space among the plurality of spaces; and adjusting density information of pixels contained in the particular space, based on the average density information of the particular space, whereby the above objects are achieved.

The step of adjusting the density information of the pixels may further comprise the step of adjusting the density information of pixels contained in a portion of the image data corresponding to an over exposed portion or an under exposed portion of a film.

An image processing apparatus of the present invention comprises means for dividing image data into a plurality of regions based on color information of pixels contained in the image data; and means for adjusting the density information of the pixels contained in at least one particular region among the plurality of regions, whereby the above objects are achieved.

Another image processing apparatus of the present invention is an image processing apparatus for processing image data containing a plurality of pixels and comprises means for mapping the plurality of pixels into a plurality of points in color space, based on the color information for each of the pixels; means for detecting a plurality of spaces contained in the color space, in accordance with the concentration of the plurality of points in the color space; means for adjusting the average density information of at least one particular space among the plurality of spaces; and means for adjusting density information of pixels contained in the particular space, based on the average density information of the particular space, whereby the above objects are achieved.

The means for adjusting the density information of the pixels may further comprise means for adjusting the density information of pixels contained in a portion of the image data corresponding to an over exposed portion or an under exposed portion of a film.

According to the present invention, based on the color information of pixels contained in the image data, the density information of the pixel is automatically adjusted. The masked printing technique previously used by experts thus becomes unnecessary.

According to further aspects of the present invention, the density information of the pixels contained in the portion of the image data corresponding to the under exposed or over exposed portion of the film is automatically adjusted. Thereby, even if the film is photographed with under exposed or over exposed conditions, it becomes unnecessary to adjust the time duration for printing the photographed image onto the photographic paper.

BRIEF DESCRIPTION OF THE DRAWINGS

The above and other objects and features of the present invention will be clearly understood from the following description with respect to preferred embodiments thereof when considered in conjunction with the accompanying drawings, wherein the same reference numerals have been used to denote the same or similar parts or elements, and in which.

DETAILED DESCRIPTION OF THE PREFERRED EMBODIMENTS

The general principles of the present invention will now be explained. For automatically using a masked printing technique, it is critical to determine which part of an image is to be masked. Accordingly, for automatically performing masked printing, it is necessary to automatically dividing image data into a region to be provided with a mask and a region that does not need to be provided with a mask.

This invention uses the color information of the pixels contained in the image data to divide the image data into these regions. The color information of the pixels is represented by a set of components, e.g. red, green and blue that represent the three primary colors.

A photographed subject (object) can be a solid, for example. Alternatively, if the subject (object) is a plane, it is often photographed with depth. In such cases, the difference in density appears in the object image. For example, shading appears at a spherical surface of a red sphere subjected to light from a certain direction, while the color of the sphere is kept red regardless of the shading.

Accordingly using such a way of thinking and applying it to colors, it is possible to divide the image data into a plurality of regions. For example, by dividing a region whose color is red and another region that is not, the red sphere can be detected as a circular region.

A masked printing effect can be achieved by keeping the original density information at a plurality of regions obtained by dividing the image data, while operating on the density information for each of the other regions.

Also, for a portion of the image data corresponding to an over exposed portion or an under exposed portion of the film, it is preferable to emphasize the image by performing a process that multiplies it with a coefficient having an opposite characteristic to the film characteristic. The embodiments of the present invention will now be described with reference to the drawings.

Figure 1:
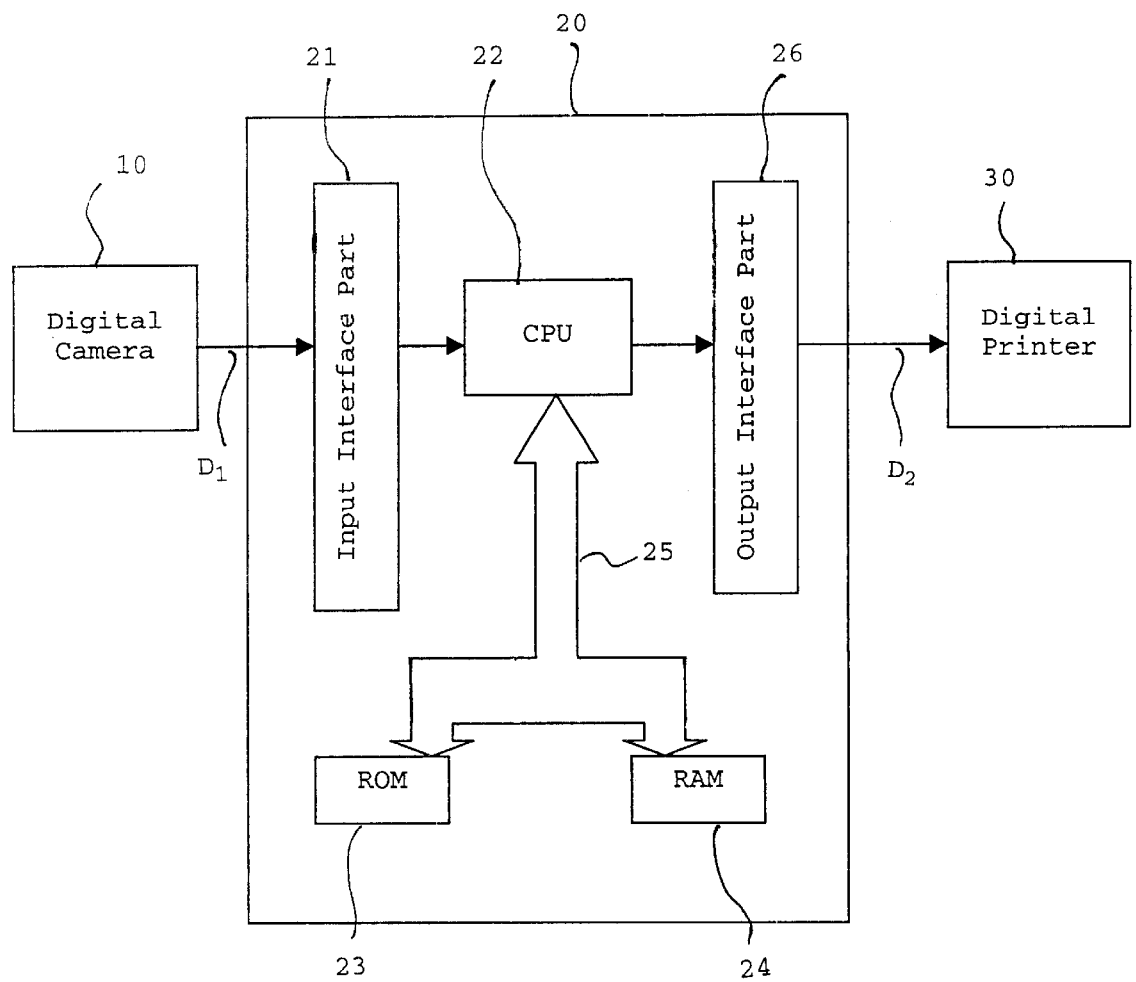
FIG. 1 is a block diagram showing the configuration of an embodiment of the image processing apparatus according to the present invention.

FIG. 1 shows a configuration of an image processing apparatus 20 of an embodiment of this invention. The image processing apparatus 20 includes an input interface part 21, a CPU 22, a read only memory (ROM) 23, a random access memory (RAM) 24 and an output interface part 26.

A digital camera 10 is connected to the input interface part 21 of the image processing apparatus 20. The digital camera 10 can be, for example, a CCD camera. The digital camera 10 receives the image photographed on the film and outputs the image data $D_1$ corresponding to the image. The image data $D_1$ consists of a plurality of pixels. The image data output from the digital camera 10 is supplied to the CPU 22 via the input interface part 21.

The CPU 22 performs an adjustment processing program for adjusting the density information of the pixels contained in the image data $D_1$. The adjustment processing program is stored, for example, in the ROM 23. The RAM 24 is typically a hard disk built in the image processing apparatus 20. The CPU 22, ROM 23 and RAM 24 are all interconnected through a bus 25.

A digital printer 30 is connected to the output interface part 26 of the image processing apparatus 20. The image data $D_1$ processed with the image processing program becomes image data $D_2$ and it is output to the digital printer 30 via the output interface part 26. The digital printer 30 prints the revised image data $D_2$.

Figure 2:
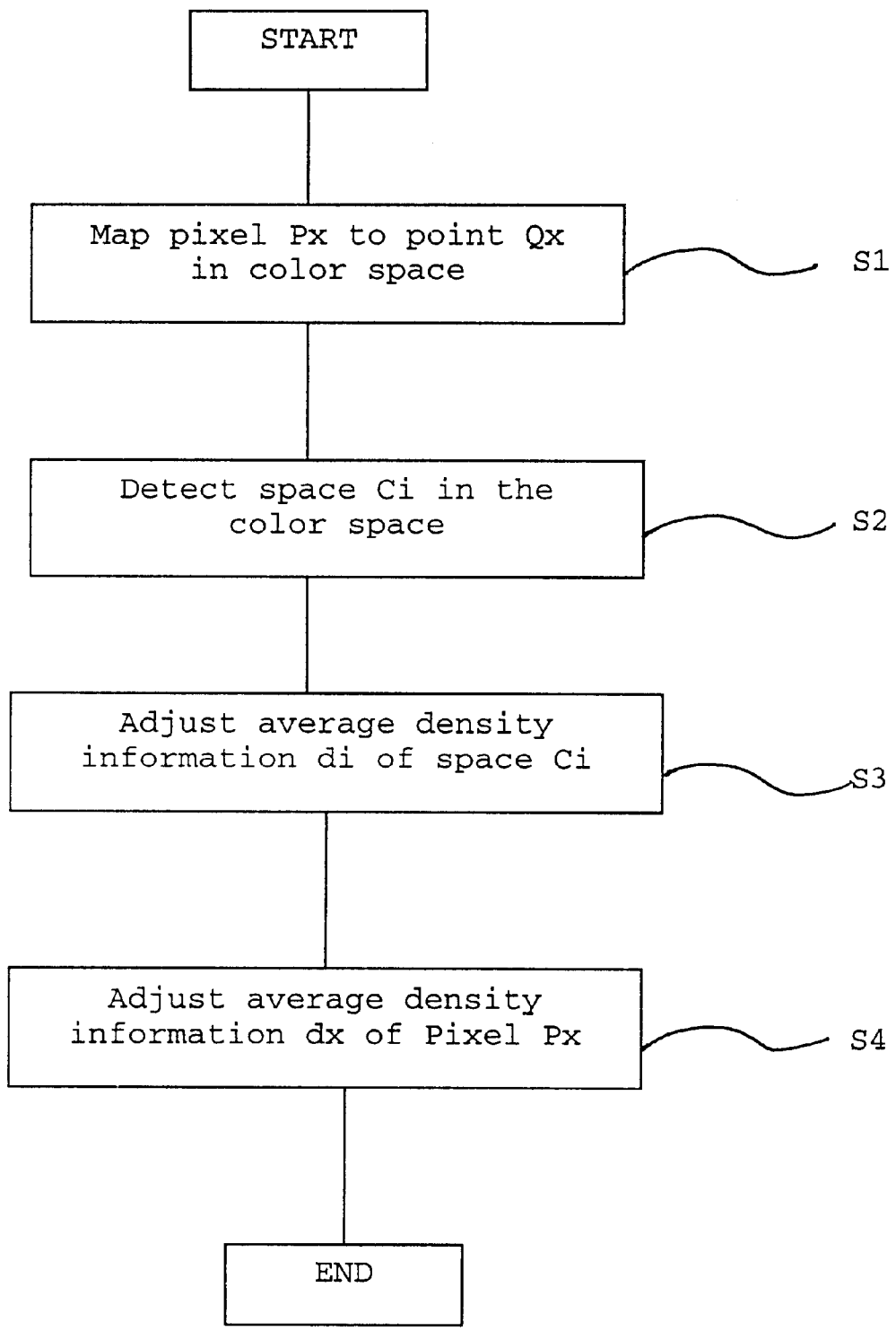
FIG. 2 is a flowchart schematically showing the adjustment processing program.

FIG. 2 shows a schematic flow of the adjustment processing program. Each step of the adjustment processing program is performed by the CPU 22.

In step S1, pixel $P_X$ is mapped into a point $Q_X$ in a color space, wherein the pixel $P_X$ represents an arbitrary pixel contained in the image data $D_1$. The mapping from the pixels $P_X$ to the points $Q_X$ in the color space will be described below with reference to FIGS. 3 and 4. In step S2, a space $C_i$ ($i=1, 2, \ldots, n$) in the color space where the concentration of the points $Q_X$ is above a predetermined threshold is detected. Herein, "n" is an arbitrary integer. How to detect the space $C_i$ will be described below with reference to FIG. 5.

In step S3, the average density information $d_i$ is adjusted. In addition, it is preferable to adjust the average density information $d_i$ of the space $C_i$ for all of "i" values. This is done for the purpose of emphasizing the difference in the average density information $d_i$ among the spaces $C_i$. But, a similar effect can also be obtained by adjusting the average density information $d_i$ of the space $C_i$ for only at least one particular "i".

In step S4, density information $d_X$ of the pixel $P_X$ is adjusted based on the average density information $d_i$ of the space $C_i$ adjusted in the step S3.

In this way the density information $d_X$ of the pixel $P_X$ is adjusted. With such an adjustment, the density information for all of the image data $D_1$ are controlled so that a region with a lighter density becomes denser and a region with more density becomes lighter. As a result, a similar effect as that achieved by manual masked printing can be obtained.

The mapping from the pixel $P_X$ to the point $d_X$ will now be described with reference to FIG. 3.

The pixel $P_X$ comprises a B value indicating a degree of blue color, a G value indicating a degree of green color and an R value indicating a degree of red color as its color information. In other words, the color information of the pixel is represented with ($b_X$, $g_X$, $r_X$). Herein, $b_X$ represents the B value of the pixel $P_X$, $g_X$ represents the G value of the pixel $P_X$ and $r_X$ represents the R value of the pixel $P_X$. Each of $b_X$, $g_X$ and $r_X$ is an integer, for example between 0 and 255.

Figure 3:
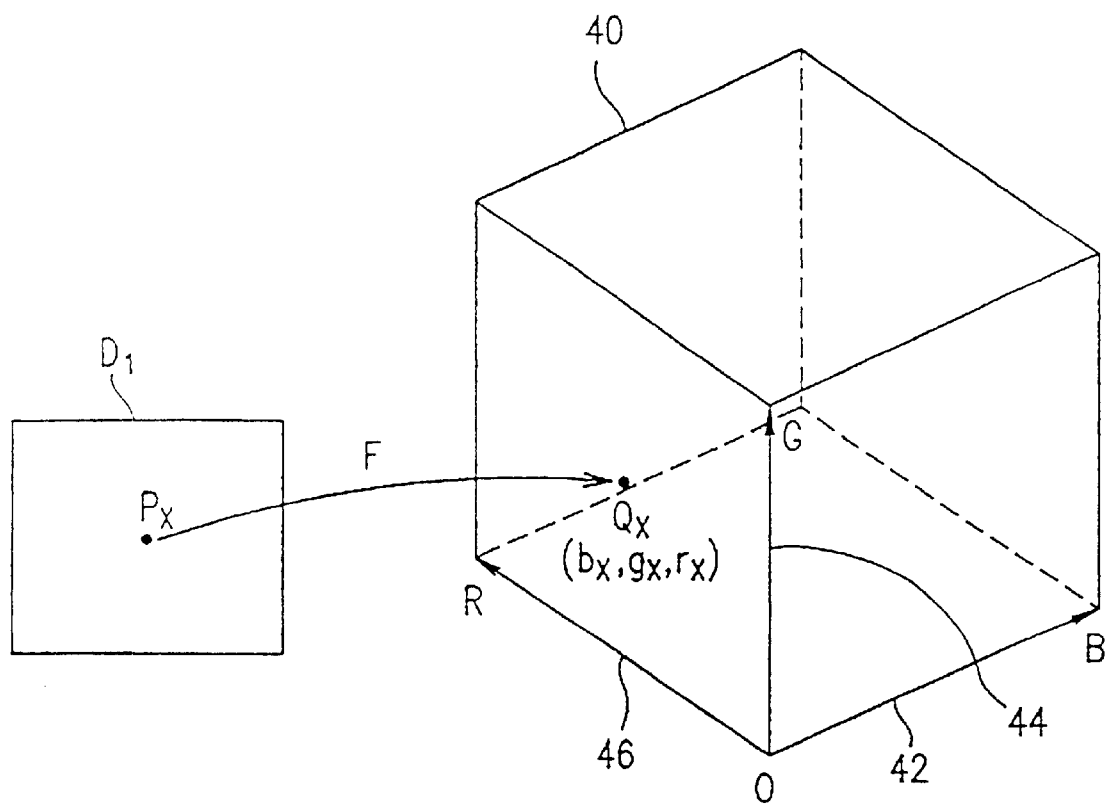
FIG. 3 is a schematic diagram describing mapping pixels $P_X$ to points $Q_X$ in a color space.

The pixel $P_X$ is mapped to the point $Q_X$ in the color space 40 through mapping F shown in FIG. 3. Herein, the point $Q_X$ is a point with coordinates ($b_X$, $g_X$, $r_X$). The color space 40 is a three dimensional space defined with a B axis 42, a G axis 44 and an R axis 46.

By mapping all pixels $P_x$ contained in the image data into the color space 40, a set of the points $Q_X$ can be obtained.

Figure 4:
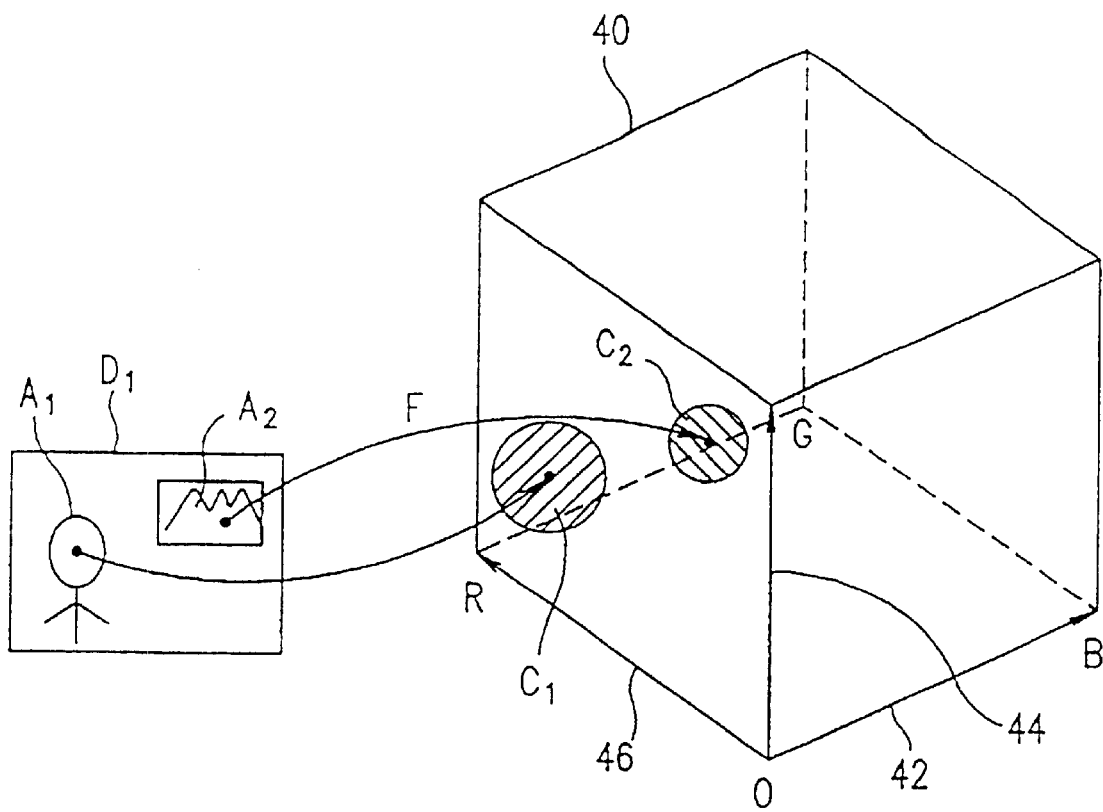
FIG. 4 is a schematic diagram showing an example of the distribution of the points $Q_X$ in the color space.

FIG. 4 shows an example of the distribution of the points $Q_X$ in the color space 40. In FIG. 4, spaces $C_1$ and $C_2$ indicated with the hatching represent regions with high concentrations of the points $Q_X$ in the color space 40. The spaces $C_1$ and $C_2$ correspond to regions $A_1$ and $A_2$ with different colors in the image data $D_1$. This is because the proximity of the points $Q_X$ in the color space 40 are correlated with the similarity of colors in the image data $D_1$. For example, the region $A_1$ is a region related to a beige face in the image data $D_1$, and the region $A_2$ corresponds to a green mountain in the image data $D_1$.

In FIG. 4, each pixel contained in the region $A_1$ of the image data $D_1$ is mapped into the space $C_1$ of the color space 40 by the mapping F, and each pixel contained in the region $A_2$ of the image data $D_1$ is mapped into the space $C_2$ of the color space 40. This indicates that the image data D1 is divided at least into the regions $A_1$ and $A_2$ based on the color information of the pixels contained in the image data $D_1$. In this way, the image data $D_1$ may similarly be divided into N regions based on the color information of the pixels contained in the image data $D_1$. Herein, N is an arbitrary integer equal to or greater than 2.

Figure 5:
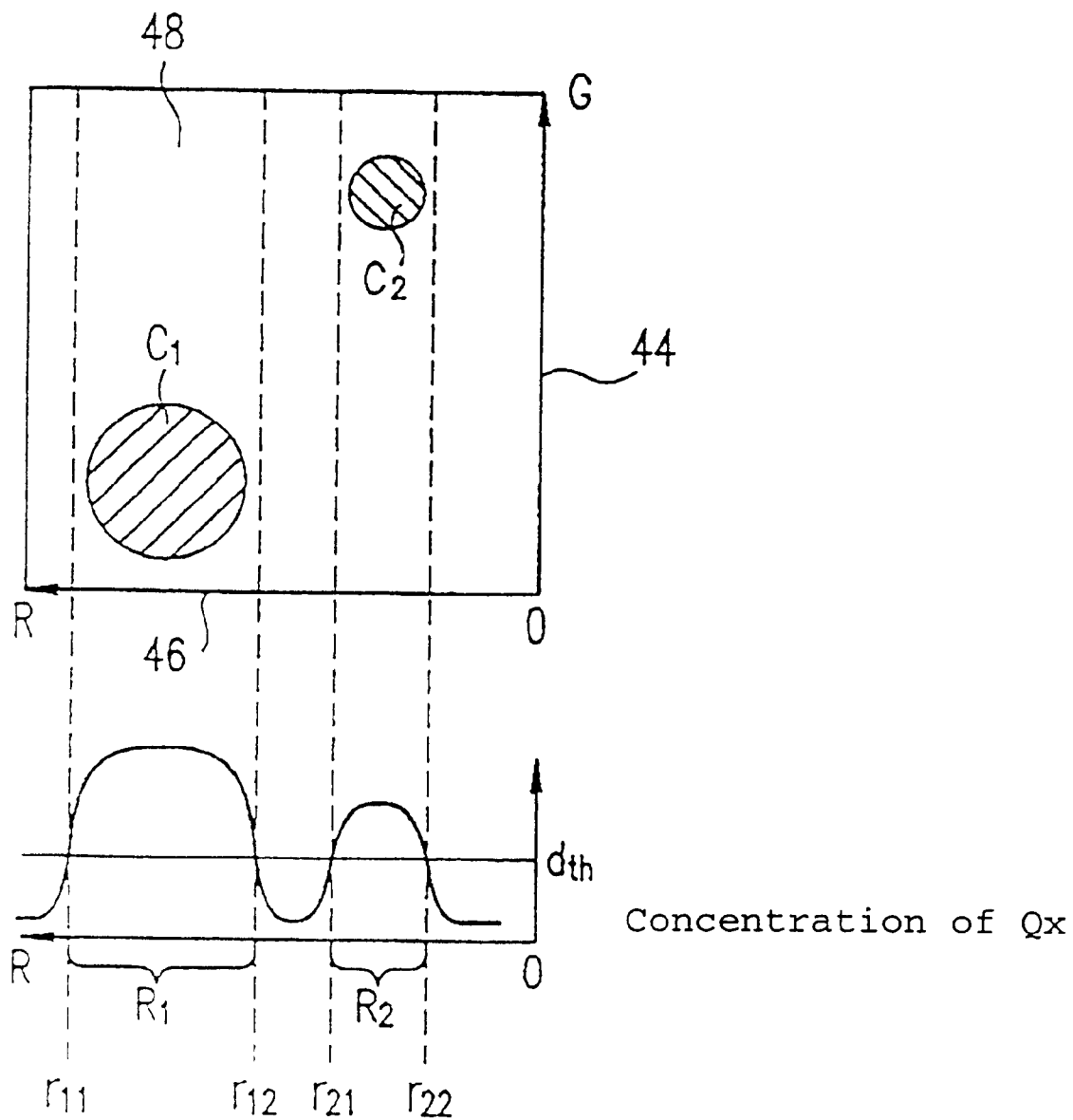
FIG. 5 is a schematic diagram for describing detection of the spaces $C_1$ and $C_2$ in the color space.

It will now be described specifically how to detect the space $C_1$ and $C_2$ in the color space 40 with reference to FIG. 5. In FIG. 5, a plane 48 is a plane defined with the G axis 44 and the R axis 46. Regions $R_1$ and $R_2$ are regions where the concentrations of points $Q_X$ detected are above a predetermined threshold. This is accomplished by examining the distribution of points $Q_X$ along the R axis 46. The regions $R_1$ and $R_2$ are defined by the following equations (1).

$$R_1: r_{11} \leq R \leq r_{12}$$
$$R_2: r_{21} \leq R \leq r_{22} \qquad (1)$$

where $r_{11}$, $r_{12}$, $r_{21}$ and $r_{22}$ are constants.
Similarly, regions $G_1$ and $G_2$ where the concentrations of points $Q_X$ is above a predetermined threshold. This is accomplished by examining the distribution of the points $Q_X$ along the G axis 44. The regions $G_1$ and $G_2$ are defined by the following equations (2).

$$G_1: g_{11} \leq G \leq g_{12}$$
$$G_2: g_{21} \leq G \leq g_{22} \qquad (2)$$

where $g_{11}$, $g_{12}$, $g_{21}$ and $g_{22}$ are constants.
Similarly, regions $B_1$ and $B_2$ are regions where the concentrations of points $Q_X$ is above a predetermined threshold. These regions are detected by examining the distribution of the points $Q_X$ along the B axis 42. The regions $B_1$ and $B_2$ are defined by the following equations (3).

$$b_1: b_{11} \leq B \leq b_{12}$$
$$B_2: b_{21} \leq B \leq b_{22} \qquad (3)$$

where $b_{11}$, $b_{12}$, $b_{21}$ and $b_{22}$ are constants.
According to the equations 1 thorough 3, the space $C_1$ and $C_2$ in the color space 40 are represented by the following equations (4).

$$C_1: r_{11} \leq R \leq r_{12}, \text{ and, } g_{11} \leq G \leq g_{12}, \text{ and, } b_{11} \leq B \leq b_{12}$$
$$C_2: r_{21} \leq R \leq r_{22}, \text{ and, } g_{21} \leq G \leq g_{22}, \text{ and, } b_{21} \leq B \leq b_{22} \qquad (4)$$

A process to adjust the average density information $d_i$ of the space $C_i$ in the step S3 will now be described in detail.

The average density information $d_i$ is calculated according to the following equations (5). In other words, the average density information $d_i$ is obtained by summing the density information $d_X$ corresponding to all of the points $Q_X$ contained in the space $C_i$.

$$d_i = \Sigma_{QX \in Ci} d_X$$
$$d_X = (b_X + g_X + r_X)/3 \qquad (5)$$

Variation $\Delta d_i$ is calculated according to the following equation (6).

$$\Delta d_i = (T - d_i) \times K \qquad (6)$$

where T represents a predetermined constant indicating a target value, and K represents a predetermined coefficient. T is, for example, a registered center value of a monitor. The color information $(b_X, g_X, r_X)$ of the pixel $P_X$ is updated into new color information $(b_{X'}, g_{X'}, r_{X'})$ according to the following equations (7).

$$b_{X'} = b_X + \Delta d_i$$
$$g_{X'} = g_X + \Delta d_i$$
$$r_{X'} = r_X + \Delta d_i \qquad (7)$$

New density information $d_{X'}$ of the pixel $P_X$ corresponds to the new color information $(b_{X'}, g_{X'}, r_{X'})$ according to the following equations (8).

$$d_{X'} = (b_{X'} + g_{X'} + r_{X'})/3 \qquad (8)$$

Further, new average density information $d_{i'}$ of the space $C_i$ corresponding to the new color information $(b_{X'}, g_{X'}, r_{X'})$ is calculated according to the following equations (9).

$$\begin{aligned}D'_i &= \sum_{QX \in Ci} d'_X \\ &= \sum_{QX \in Ci} \{(b'_X + g'_X + r'_X)/3\} \\ &= \sum_{QX \in Ci} \{(b_X + \Delta d_i + g_X + \Delta d_i + r_X + \Delta d_i)/3\} \\ &= \sum_{QX \in Ci} \{(b_X + g_X + r_X)/3 + \Delta d_i\} \\ &= \sum_{QX \in Ci} (d_X + \Delta d_i) \\ &= \sum_{QX \in Ci} d_X + \Delta d_i \\ &= d_i + \Delta d_i\end{aligned} \qquad (9)$$

As seen from the equations 6 through 9, in case of the average density information $d_i$ of the space $C_i$ being greater than the target value T, the new average density information $d_{i'}$ decreases with the amount of the variation $\Delta d_i$. In case the average density information $d_i$ of the space $C_i$ is less than the target value T, the new average density information $d_{i'}$ increases with the amount of the variation $\Delta d_i$. The absolute value of the variation $\Delta d_i$ increases as the average density information $d_i$ of the space $C_i$ deviates from the target value T.

Figure 6:
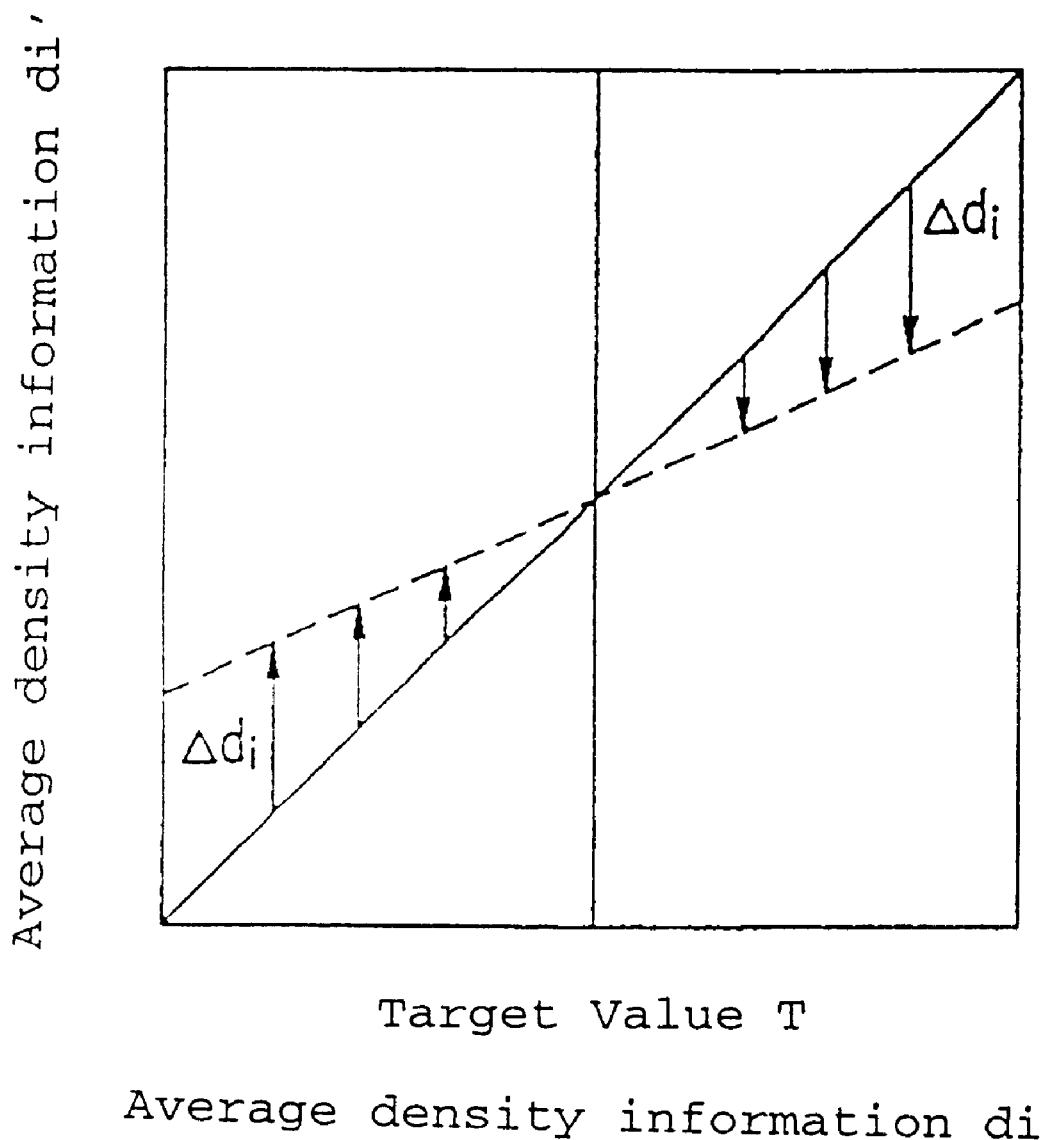
FIG. 6 is a schematic diagram showing the relationship between the average density information $d_i$ of the space $C_i$ and the new average density information $d_i'$ of the space $C_i$.

FIG. 6 shows the relationship between the average density information $d_i$ of the space $C_i$ and the new density information $d_{i'}$ of the space $C_i$. In FIG. 6, the solid line indicates the average density information $d_i$ of the space $C_i$, and the broken line indicates the average density information $d_{i'}$ of the space $C_i$. As indicated, the line indicating the average density information of the space $C_i$ is moved in such a direction that a lighter density region becomes denser and a denser region becomes lighter.

Although in FIG. 6, the new average density information $d_{i'}$ is represented by the straight line, it is possible that a curve with a certain curvature may also represent it. For example, the curvature may be a cubic curve which is represented by the equation $Y = a*X^3 + b*X^2 + c*X + d$ where a, b, c and d are constants.

In the case where an under exposed image or an over exposed image is photographed on the film, the image may not be able to be properly printed in a photographic paper. The reason why such a phenomenon occurs is that a region of the film characteristic with a bad linearity has been reached. Such a characteristic region is preferably multiplied by a coefficient to provide a pseudo linearity. For example, the color information ($b_X$, $g_X$, $r_X$) of the pixel $P_X$ is preferably shifted so as to have an opposite characteristic of or against the film characteristic.

For example, for emphasizing the under exposed image photographed to the film, according to the following equations (10), the color information ($b_X$, $g_X$, $r_X$) of the pixel $P_X$ may be updated to new color information ($b_{X'}$, $g_{X'}$, $r_{X'}$), and the density information $d_X$ may be updated to the new density information $d_{X'}$.

$$d_X = (b_X + g_X + r_X)/3$$
$$sht = K_1 \times \ln(d_X) - K_2$$
$$b_{X'} = b_X + sht$$
$$g_{X'} = g_X + sht$$
$$r_{X'} = r_X + sht$$
$$d_{X'} = (b_{X'} + g_{X'} + r_{X'})/3 \quad (10)$$

where $K_1$ and $K_2$ are predetermined positive coefficients.

Then, it is possible to compensate the under exposed portion or the over exposed portion by adjusting the color information ($b_X$, $g_X$, $r_X$) and the density information $d_X$ of the pixel $P_X$. Thereby, even if the film is photographed such that it is under exposed or over exposed, adjusting the time duration of printing the image photographed on the film to the photographic paper can be made unnecessary.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

The text of Japanese priority application number 10-140291 is incorporated herein by reference.

What is claimed is:

1. An image processing method for image data containing points, said method comprising the steps of:
    defining a particular region having the same color character based on color information of pixels contained in image data, wherein color information of the pixels is represented by a set of components representing three colors, the particular region being a region where concentrations of points of the image data are detected above a predetermined threshold for a particular one of the three colors;
    calculating average density information of the particular region by summing density information corresponding to all points in the particular region;
    calculating a variation in density information for the points in the particular region; and
    adjusting the density information of the pixels contained in the particular region based on the variation in the density information for the points in the particular region.

2. The image processing method as defined in claim 1, wherein said step of adjusting density information further comprises the step of adjusting density information of pixels in a portion of the image data corresponding to at least one of an over exposed portion and an under exposed portion.

3. The image processing method as defined in claim 1, wherein said step of dividing image data into the plurality of regions includes comparing the color information of the pixels with predetermined thresholds.

4. An image processing method for processing image data containing a plurality of pixels, comprising the steps of:
    mapping the plurality of pixels as a point in a color space based on color information for each of the pixels;
    defining a particular region having the same color character in the color space according to a concentration of points in the color space, wherein color information of the pixels is represented by a set of components representing three colors, the particular region being a region where concentrations of points of the image data are detected above a predetermined threshold for a particular one of the three colors;
    calculating average density information of the particular region;
    calculating a variation in density information for the points in the particular region; and
    adjusting the density information of pixels contained in the particular region based on the average density information of the particular region.

5. The image processing method as defined in claim 4, wherein said step of adjusting density information further comprises the step of adjusting density information of pixels contained in a portion of the image data corresponding to at least one of an over exposed portion and an under exposed portion.

6. The image processing method as defined in claim 4, wherein said step of mapping includes mapping to a three dimensional color space.

7. The image processing method as defined in claim 4, wherein said step of detecting a plurality of spaces includes using predetermined thresholds for each of the spaces.

8. The image processing method as defined in claim 6, wherein said step of detecting a plurality of spaces includes using six predetermined thresholds for each of the spaces.

9. An image processing apparatus for processing image data including pixels comprising:
    means for defining a particular region having the same color character based on color information of pixels in image data, wherein color information of the pixels is represented by a set of components representing three colors, the particular region being a region where concentrations of points of the image data are detected above a predetermined threshold for a particular one of the three colors;
    means for calculating average density information of the particular region by summing density information corresponding to all points in the particular region;
    means for calculating a variation in density information for the points in the particular region; and
    means for adjusting the density information of the pixels in the particular region based on the variation in the density information for the points in the particular region.

10. The image processing apparatus as defined in claim 9, wherein said means for adjusting density information of the pixels further comprises means for adjusting density information of pixels in a portion of said image data corresponding to at least one of an over exposed portion and an under exposed portion.

11. The image processing apparatus as defined in claim 9, wherein said means for dividing said image data comprises means for comparing the color information of the pixels with predetermined thresholds.

12. An image processing apparatus for processing image data containing a plurality of pixels, comprising:

means for mapping the plurality of pixels as a point in a color space based on color information of each of said pixels;

means for defining a particular region having the same color character in said color space according to densities of points in said color space, wherein color information of the pixels is represented by a set of components representing three colors, the particular region being a region where concentrations of points of the image data are detected above a predetermined threshold for a particular one of the three colors;

means for calculating average density information of said particular region;

calculating a variation in density information for the points in the particular region; and means for adjusting density information of pixels in said particular region based on said average density information of said particular region.

13. The image processing apparatus as defined in claim 12, wherein said means for adjusting density information of the pixels further comprises means for adjusting density information of pixels in a portion of said image data corresponding to at least one of an over exposed portion and an under exposed portion.

14. The image processing apparatus as defined in claim 12, wherein said color space is a three dimensional space.

15. The image processing apparatus as defined in claim 12, wherein said plurality of spaces includes predetermined thresholds for each of the spaces.

16. The image processing apparatus as defined in claim 14, wherein said plurality of spaces includes six predetermined thresholds for each of the spaces.

* * * * *